United States Patent [19]

Norris et al.

[11] Patent Number: 4,704,145

[45] Date of Patent: Nov. 3, 1987

[54] MODULAR MULTI-CHANNEL PARTICLE SEPARATOR

[75] Inventors: Richard M. Norris, Stratford; Bert A. Diehl, Jr., Orange, both of Conn.

[73] Assignee: Avco Corporation, Providence, R.I.

[21] Appl. No.: 879,447

[22] Filed: Jun. 27, 1986

[51] Int. Cl.⁴ ............................................. B01D 39/00
[52] U.S. Cl. .................................. 55/306; 60/39.092; 60/39.093; 55/440
[58] Field of Search ............... 55/306, 440; 60/39.091, 60/39.092, 39.093

[56] References Cited

U.S. PATENT DOCUMENTS

| | | | |
|---|---|---|---|
| 2,764,390 | 9/1975 | Harris | 60/39.093 |
| 3,978,656 | 9/1976 | Murphy | 55/306 |
| 4,268,284 | 5/1981 | Kent et al. | 55/440 |

Primary Examiner—Bernard Nozick
Attorney, Agent, or Firm—Perman & Green

[57] ABSTRACT

A modular multi-channel particle separator is provided to block foreign objects from entering the inlet of a gas turbine engine and to remove particulate matter from the inlet air stream before it reaches the compressor section of the engine. Each module is designed for easy fabrication from sheet material which can be readily configured to remove both fine and coarse particles from the air stream with minimal pressure loss, system volume and weight. Each module also defines passages for removing particular matter that has been intercepted and for conducting heating air through the module to prevent icing. The modular construction of the separator simplifies initial assembly in the gas turbine engine, as well as later maintenance and replacement of one or more modules, should that prove necessary.

12 Claims, 4 Drawing Figures

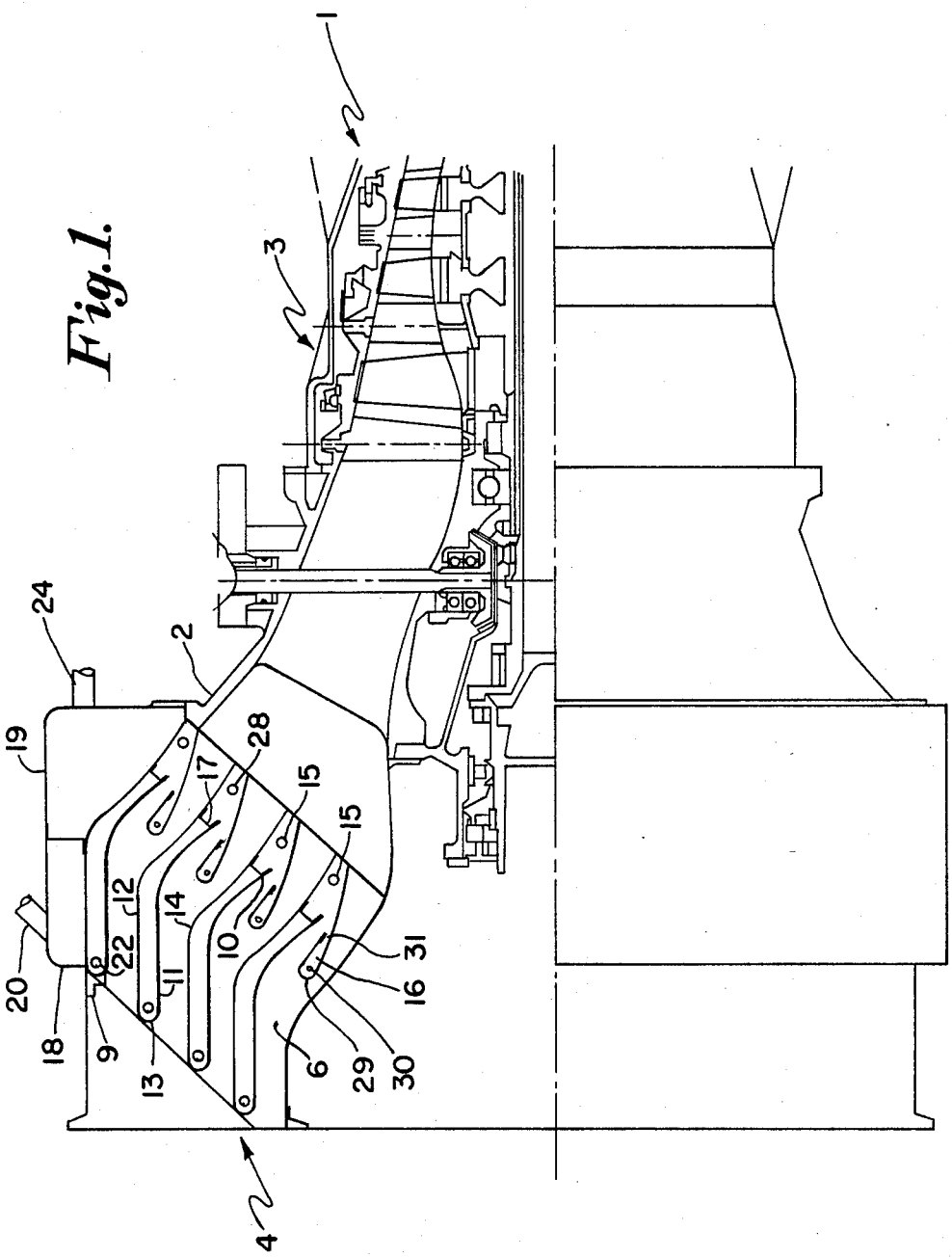

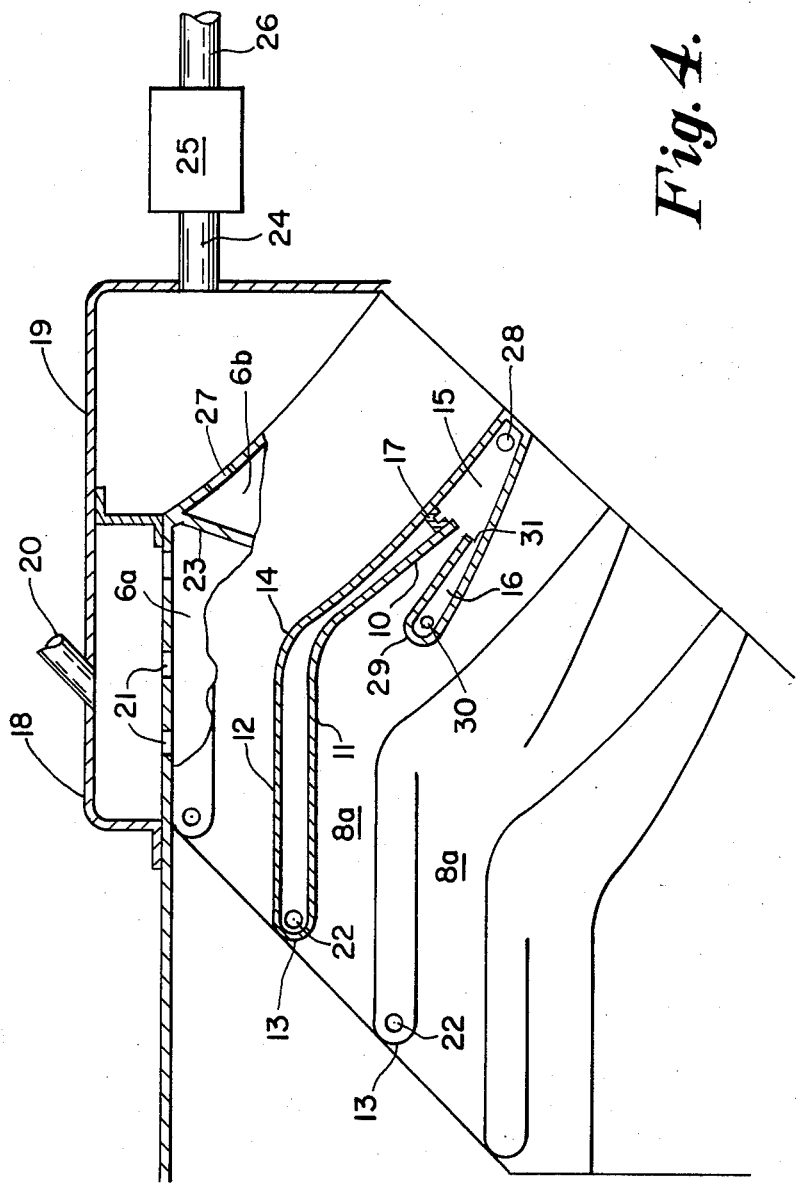

MODULAR MULTI-CHANNEL PARTICLE SEPARATOR

BACKGROUND OF THE INVENTION

Gas turbine engines frequently operate in environments laden with foreign matter that can be ingested by the engine and damage it. Such foreign matter, typically sand and dust, can erode the engine's components so badly that the engine's stall margin, power, or fuel consumption becomes unacceptable. In addition, the engine may be damaged catastrophically by the ingestion of large foreign objects, such as birds, ice (hail) or hand tools. To deal with such problems, engine inlet particle separators have been provided in a variety of configurations for more than twenty years. In recent years, military services have required that the particle separators be an integral part of the engine's design rather than an add-on to the engine.

The degree of protection required is primarily a function of the engine's operating environment and the tolerance of the engine's components to erosion and impact damage. Aircraft that operate from prepared landing sites and generally fly their missions at relatively high altitude may not require engine inlet protection to achieve the engine's design lifetime. However, helicopters, which often operate from unprepared sites, require highly efficient separators to preserve engine integrity. Modern, high efficiency, gas turbine engines generally employ blades with relatively high rotational speeds and intricate cooling-air networks that are very susceptible to erosion damage and blockage. Thus, in the absence of a specific mission definition, particle separator efficiency must be maintained at a high level at all times to protect the engine and assure reliability, availability and maintainability.

The need for effective particle separators for gas turbine engines has generated many concepts for coping with the problem. A multi-channel separator mounted in the inlet of an engine is disclosed in U.S. Pat. No. 3,778,983 issued to G. G. Rygg and assigned to the assignee of the present patent application. Another type of separator, incorporating means for inhibiting ice formation on the separator, is disclosed in U.S. Pat. No. 3,978,656, issued to J. P. Murphy and also owned by the assignee of the present patent application. Another type of separator is disclosed in U.S. Pat. No. 4,268,284 issued to R. M. Norris and A. J. Charlton and also owned by the assignee of the present patent application. U.S. Pat. No. 4,527,387, issued to F. A. Lastrina and assigned to General Electric Company, discloses still other prior art separators for gas turbine use.

SUMMARY OF THE INVENTION

The preferred embodiment of the present invention provides a modular multi-channel particle separator for a gas turbine engine. The modules are removably mounted in an annular array in the inlet of the engine so that each one may be easily installed and removed for maintenance or replacement without disturbing the other modules.

Each module comprises a plurality of hollow vanes, mounted between hollow side walls, the vanes defining between them parallel flow channels through which the incoming air stream flows to the compressor section of the gas turbine engine. The flow paths are proportioned to prevent the passage of large foreign objects, such as hail stones, but readily direct the air stream through a region of reduced cross-section where the air stream, and any particles that it may be carrying, are accelerated. As the air stream nears maximum velocity, it undergoes a change of direction, but the inertia of the particles carry them in a substantially straight path to a particle trap. The vanes are formed to define deflectors adjacent the traps to inhibit particle rebound back into the air stream as it enters the compressor section of the engine.

The side walls of each module are partitioned to define two passageways. Into one, warm air, bled from the compressor section of the engine, is introduced from an air supply gallery surrounding the modules. The warm air flows through the side walls to channels formed in the vanes, the air first being directed across the leading edges of the vanes and then through exhaust ports near the particle traps. In this manner the temperature of the modules is maintained at a level above that where ice will form.

The other passageway in each side wall is connected to a scavenge chamber, also surrounding the modules. The scavenge chamber is connected to a scavenge pump or other means for evacuating it, the suction in the chamber drawing particles out of the trap, through the hollow side walls and chamber to the scavenge pump by which they are ejected to the atmosphere. Anti-icing air from the vanes mixes with the particle laden air drawn from the traps by the scavenging system.

Both the vanes and associated side walls of the modules are made from sheet material that can readily be formed to the shapes required. No intricate tooling is required and, as a result, the modules, and hence the separator assembly as a whole, can be made at relatively low cost. Being easily formed, the vanes can be made to exact dimensions, and hence the flow paths they define can be held to close tolerances. This is important in producing a structure that is highly effective in removing extremely small, as well as large, particles with a minimum pressure drop in the air stream flowing through the separator.

DESCRIPTION OF THE DRAWINGS

The invention is described in more detail below with particular reference to the attached drawings in which:

FIG. 1 is a longitudinal cross sectional view of a gas turbine engine equipped with the novel particle separator disclosed herein;

FIG. 4 is an enlarged longitudinal sectional view of adjacent vanes defining a flow path through which air flows to the compressor section of the gas turbine engine.

DESCRIPTION OF SEPARATOR

Shown in FIG. 1 is a gas turbine engine, generally designated 1, having an inlet section 2 through which the incoming air stream flows before entering the engine's compressor section, generally designated 3. In accordance with the present invention, an annular array of multi-channel particle separator modules, generally designated 4, are removably mounted in inlet section 2.

Figure 2:
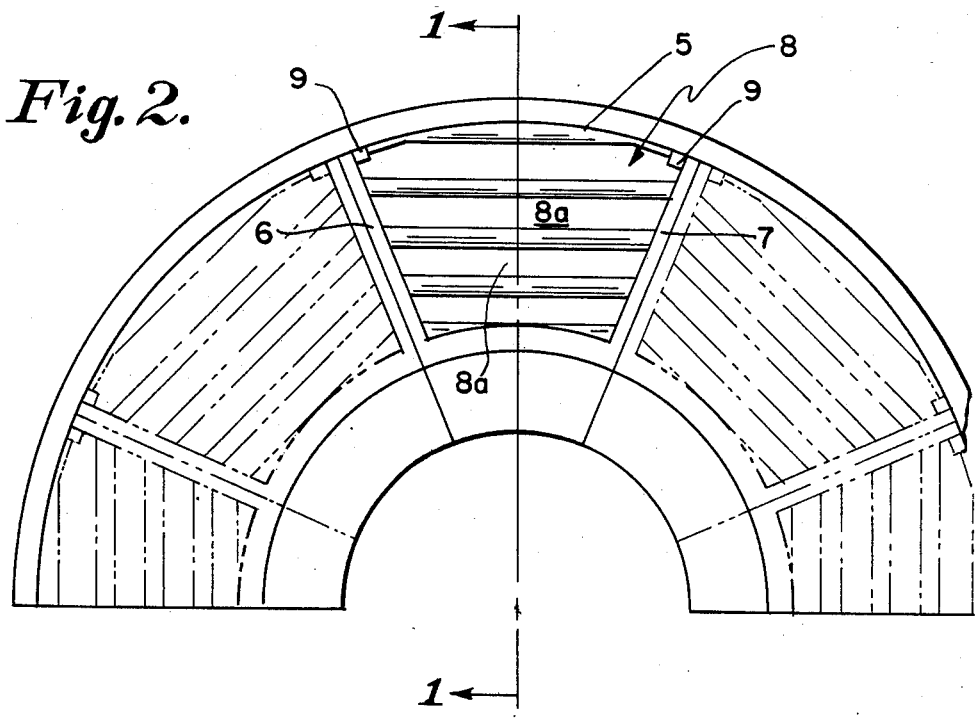
FIG. 2 is a front elevational view of an array of modules assembled in the inlet of the gas turbine engine, one of the modules being shown in detail whereas the others are indicated by phantom line.

As shown in FIG. 2, the modules 4 are wedge shaped when viewed from the front of the engine. For clarity, only the top central module 5 in the array will be described in detail, but it should be understood that all other modules in the array are identical in construction and operation. Each module has side walls 6 and 7 integrally supporting a plurality of transverse vanes, generally designated 8. The module, closely fitted within the engine inlet and conforming to its wall curvatures as shown in FIG. 1, is held in place and located relative to the inlet by suitable retaining means 9.

To keep weight to a minimum and facilitate fabrication, the modules may be made from sheet material.

It will be noted in FIG. 2 that the side walls 6 and 7 have plane surfaces and that the vanes 8 likewise are defined by transverse linear elements.

FIG. 1 shows how a single sheet of metal or composite may be bent into a vane having the aerodynamic characteristics required for superior particle separation. Each vane is hollow, as described more fully with reference to FIG. 4, and comprises a deflector 10 which is an extension of a wall 11. Wall 11 parallels another wall 12 to which it is joined by leading edge 13. The wall 12 merges into a transition section 14 which slopes at an angle to trap 15 which captures particles from the air stream as will be described shortly. Trap 15 has a "V" formation in cross section defined by the sheet of metal being bent back towards the leading edge 13, the sheet then being bent back upon itself again to form passageway 16. Spacers 17 help support the deflector 10 in proper spaced relationship with traps 15.

As shown in FIG. 2, the vanes are secured, as by welding or brazing, to side walls 6 and 7, forming a rigid, stable structure. The radial spacing between the vanes is small enough to prevent passage of foreign objects, such as hail, nuts, bolts, etc. yet large enough to provide a relatively unimpeded flow path for the air stream entering the engine. The vanes are staggered uniformly towards the outside of the engine (see FIGS. 1 and 3), providing a greater distance between the leading edges of the vanes without necessitating a larger inlet annulus for the engine.

As mentioned earlier, the modules are slid within the engine's inlet and secured in place by clips 9. In their installed position, they are surrounded by an anti-icing air supply gallery 18 and a scavenge chamber 19 mounted to the exterior of the engine's inlet section 2. Warm air under pressure is bled from the engine's compressor section and introduced through conduit 20 to the anti-icing air supply gallery from which the air flows to the separator modules through holes 21 (see FIG. 4). When the modules are mounted on the engine's inlet section, they are automatically oriented so that the holes 21 register with the hollow interiors of side walls 6 and 7. The side walls convey the warm air to holes 22 which introduce the air to the interiors of leading edges 13 of the vanes 8. The air warms the vanes, inhibiting ice formation, before leaving the vanes by flowing past spacers 17 into the region of the traps 15.

Figure 3:
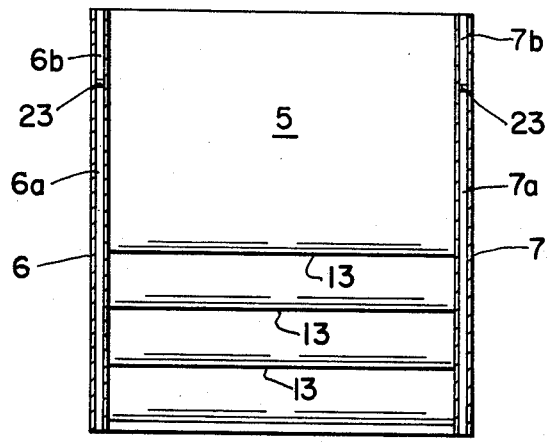
FIG. 3 is a top view of an individual module.

As shown in FIG. 3, the hollow space within each side wall 6 and 7 is divided by a radial partition 23. In effect, the partition establishes two separate passageways, 6a–6b and 7a–7b, through the side walls, passageways 6a and 7a conveying warm air to the vanes and passageways 6b and 7b scavenging particles from traps 15, as will now be described.

Scavenge chamber 19 is connected at 24 to a scavenge pump 25 which maintains a vacuum inside the scavenge chamber at all times. The scavenge pump exhausts to the atmosphere at 26. Holes 27 (see FIG. 4) place the scavenge chamber in fluid communication with passageways 6b and 7b which in turn communicate with traps 15 via holes 28. Since the entire scavenge system operates at a pressure lower than the ambient pressure prevailing adjacent the traps, particles collected in the traps are carried laterally to holes 28 and thence through passageways 6b and 7b in the side walls of the modules, through the scavenge chamber and eventually to the atmosphere via the scavenge pump.

Operation

The operation of the modular multi-channel particle separator system is best described with reference to FIG. 4. First, it should be observed that adjacent vanes 8 define a series of parallel flow channels 8a through which the incoming air flows towards the engine's compressor section. As the air approaches the transition section 14 and moves towards the deflector 10, the air stream changes direction and is divided by splitter lip 29 formed by the construction of the vane wherein the vane is bent back upon itself to form passageway 16. Because of the inertia of the particles carried by the air stream, they travel a substantially straight path along the face of the deflector into the particle trap 15 where they are captured. The main air stream flows along the other side of the particle trap. The entire flow pattern is lamina in nature and substantially free of swirl and eddy currents. As a result, separation of small particles, as well as larger ones having greater inertia, is effeciently executed. Further, very little of the air stream's energy is dissipated in the separator so pressure losses across it are very modest in comparison to prior art devices.

In prior art devices, efficient separation of small particles depends upon high particle inertia generated through high velocities or a rapid turn. Sharp bend curvatures create very high local velocities which causes high pressure losses unless the ratio of cross channel width to radius of curvature is maintained small. To do this with a single channel separator requires that the flow path be located at a large diameter so that the area can be obtained at a small cross channel width. The result is a very large and undesirable frontal area and axial length.

The multi-channel concept, however, provides for performance consistency regardless of flow size because the channel configuration can be developed to a high efficiency in the low single-channel flow size regime with scaling accomplished by adding additional channels or flow paths to satisfy the higher airflow requirements. The multi-channel approach to high efficiency in separating small particles is based on the reduced cross channel distance a particle must travel to be separated. In addition, the multi-channel configuration not only improves small particle removal efficiency but also tends to reduce the axial length of the system and the requirement for high separator air flow velocities. This allows a lower pressure loss even with an increase in "wetted" surface area.

Anti-icing is also accomplished more easily in the preferred embodiment than in prior art type vortex tubes and vane type separators. Not only are such prior art tubes and separators inherently larger in volume but also more difficult to keep ice free. In the preferred embodiment, warm anti-icing air is continuously supplied to holes 22 in side walls 6 and 7 (see FIG. 4) and thence into the interior of the vanes 8. The warm air circulates along the interior of leading edges 13 before flowing past spacers 17 and into the region of particle traps 15. The spent anti-icing air mixes with the scavenged airflow and flows laterally through holes 28 and then through the remainder of the scavenging system to the atmosphere as has been described ensuring that the scavenge system is maintained ice free by charge heating. It should be noted that the anti-icing air flows from both side walls towards the center of the vanes while the scavenged air and particles flow from the center region of the vanes laterally towards both side walls.

Since it is important that no ice form on any of the surfaces of the separator, holes 30 are provided in communication with passageways 6a and 7a in the side walls and with passageway 16 within the splitter lip 29. Anti-icing air is thus provided to the interior of the splitter lips from which it flows through gap 31 to the traps 15 where it joins with air being scavenged from the separator.

Conclusion

From the foregoing description of the preferred embodiment of the present invention it will be understood that a highly efficient particle separator is provided, the separator being built in modules for installation within the air intake of a gas turbine engine. All modules are identical and interchangeable, simplifying the maintenance of parts inventories and reducing maintenance costs. At any time, whether during initial installation, later removal for inspection or repair, or when not required, the modules may be easily and speedily attached and detached from the engine by use of simple fasteners.

The configuration of each module simplifies manufacture while making it possible to hold within close tolerances critical dimensions in the flow paths between adjacent vanes. Thus, improved operation is made possible while costs are reduced compared to prior art devices.

According to the above description, the following invention is claimed as novel and is desired to be secure by Letters Patent of the United States.

We claim:

1. A modular multi-channel particle separator for removing particulate matter from an input air stream before the air stream enters a compressor section of a gas turbine engine, said separator having an air input for receiving environmental air therein and an air outlet coupled to the compressor section, said separator comprising:

a plurality of multi-channel particle separator modules mounted in an air inlet of the gas turbine engine, each of said modules comprising a pair of substantially hollow side walls disposed in a spaced-apart fashion one from the other and defining an air passage region therebetween, each of said walls being coplanarly disposed along a plane extending radially outward from a longitudinal central axis of the engine, each of said walls having a partition disposed within for providing at least a first and a second chamber region within said sidewall; and a plurality of vanes mounted along opposing edges thereof to said sidewalls within said air passage region, each of said vanes being mounted in a substantially parallel, spaced-apart fashion one to another and substantially perpendicular to a plane extending radially outward from the longitudinal central axis of the engine and passing through a midpoint of said vane, each of said vanes extending substantially from a front portion of the air passage region to a rear portion of the air passage region, the regions between said spaced-apart vanes defining air passage channels, each of said vanes having formed therein a hollow leading edge portion disposed adjacent to the front portion of the air passage channel, each of said vanes further having formed therein a rearwardly disposed V-shaped hollow region defining a trap operable for retaining particulate matter therein, each said trap being in communication with the air passage region between said hollow side walls for the removal of particulate matter from said trap, each of said vanes having a curvature operable for accelerating the altering the direction of low of the air stream passing through an associated air passage channel whereby particulate matter within the accelerated air stream is conveyed by inertial forces into one of said traps.

2. A modular multi-channel particle separator as defined in claim 1 wherein said vanes are disposed in a staggered manner one to another such that the leading edge portion of a given vane extends forward of a leading edge portion of an adjacent overlying vane.

3. A modular multi-channel particle separator as defined in claim 1 wherein each of said vanes is comprised of sheet material having bends made therein for forming said leading edge portion and said trap.

4. A modular multi-channel particle separator as defined in claim 3 wherein each of said sidewalls is provided with a first orifice in registration with said hollow leading edge portion for providing warmed anti-icing air thereto from said first chamber region, each of said sidewalls further being provided with a second orifice in registration with said trap, said second orifice coupling said trap to a region of reduced air pressure within said second chamber region whereby the retained particulate matter is withdrawn from said trap.

5. A modular multi-channel particle separator for removing particulate matter from an input air stream before the air stream enters a compressor section of a gas turbine engine, said separator having an air input for receiving environmental air therein and an air outlet coupled to the compressor section, said separator comprising:

a plurality of multi-channel particle separator modules removably mounted in an air inlet of the gas turbine engine, each of said modules comprising:

a pair of substantially hollow side walls disposed in a spaced-apart fashion one from the other and defining an air passage region therebetween, each of said walls having at least one opening therethrough in communication with a scavenging means; and a plurality of vanes mounted along opposing edges thereof to said sidewalls within said air passage region, each of said vanes being mounted in a substantially parallel, spaced-apart fashion one to another and substantially perpendicular to a plane extending radially outward from the longitudinal central axis of the engine and passing through a midpoint of said vane, each of said vanes extending substantially from a front portion of the air passage region to a rear portion of the air passage region, the regions between said spaced-apart vanes defining air passage channels, each of said vanes comprising a leading edge portion disposed adjacent to the front portion of the air passage channel, and a rearwardly disposed V-shaped hollow region defining a trap operable for retaining particulate matter therein, said trap being in communication with each said passage in said side walls, each of said vanes having a curvature operable for accelerating and altering the direction of flow of the air stream passing through an associated air passage channel whereby particulate matter within the accelerated air stream is conveyed by inertial forces into one of said traps for removal through each said opening to said scavenging means.

6. A modular multi-channel particle separator as described in claim 5 in which each of said vanes is made from a single sheet of material bent along linear elements to define a deflector joined at an angle to a first wall, said wall being positioned parallel to a second wall and held in spaced relationship with it by a leading edge, said second wall merging into a transition section passing in close proximity to said deflector and beyond it to a "V" shaped trap defined by the material being bent back upon itself towards said leading edge where it is again bent back upon itself to form a splitter lip adjacent said deflector.

7. A module multi-channel particle separator as described in claim 6 in which said spaced side walls are disposed at an angle relative to each other so that the walls will fall on radial planes of the gas turbine engine when the modules are installed directly in front of it.

8. A separator as defined in claim 5 in which each of said vanes comprises a hollow interior region which is in communication with the interior of said hollow side walls.

9. A particle separator as described in claim 8 further comprising:
a partition dividing the interior of each of said walls into at least a first and a second passageway, said first passageway accommodating flow of anti-icing air from said means for conveying to said vanes, said second passageway being connected via said openings to said traps for removal of foreign particles from said traps.

10. A particle separator as described in claim 8 further comprising:
means for conveying anti-icing air to the interior of said walls and through them to the interior of said vanes whereby formation of ice on said walls and vanes is inhibited.

11. A modular multi-channel particle separator as described in claim 8 further comprising:
an air supply gallery surrounding said modules for conveying compressor air to said hollow side walls and through them to the interior of said vanes.

12. A modular multi-channel particle separator as described in claim 3 in which said scavenging means comprises an exhaust pump connected to a scavenge chamber surrounding said modules, said scavenge chamber being in fluid communication with said traps via said openings in said hollow side walls whereby foreign matter collected in said traps may pass through said side walls to said scavenge chamber and thence to said exhaust pump.

* * * * *